United States Patent
Wilson

(10) Patent No.: US 10,476,903 B2
(45) Date of Patent: Nov. 12, 2019

(54) SYSTEMS AND RELATED METHODS FOR DETECTION, TIERED CORRELATION, AND NOTIFICATION OF RADIO FREQUENCY (RF) ANOMALIES

(71) Applicant: Ashley Duane Wilson, San Francisco, CA (US)

(72) Inventor: Ashley Duane Wilson, San Francisco, CA (US)

( * ) Notice: Subject to any disclaimer, the term of this patent is extended or adjusted under 35 U.S.C. 154(b) by 78 days.

(21) Appl. No.: 15/628,436

(22) Filed: Jun. 20, 2017

(65) Prior Publication Data

US 2017/0366569 A1    Dec. 21, 2017

Related U.S. Application Data

(60) Provisional application No. 62/352,424, filed on Jun. 20, 2016.

(51) Int. Cl.
*H04L 29/06*     (2006.01)
*G06F 21/44*     (2013.01)
(Continued)

(52) U.S. Cl.
CPC .......... *H04L 63/1425* (2013.01); *G06F 21/44* (2013.01); *H04B 1/38* (2013.01); *H04B 17/309* (2015.01); *H04L 63/1416* (2013.01); *H04L 63/1441* (2013.01); *H04L 63/20* (2013.01); *H04W 12/06* (2013.01)

(58) Field of Classification Search
CPC ............. H04L 63/1425; H04L 63/1408; H04L 63/1416; H04L 63/1441; H04L 63/162; H04L 63/20; H04W 12/06; H04W 12/10; G06F 21/44

See application file for complete search history.

(56) References Cited

U.S. PATENT DOCUMENTS

| | | | |
|---|---|---|---|
| 8,176,527 B1 | 5/2012 | Njemanze et al. | 726/2 |
| 9,338,181 B1 | 5/2016 | Burns et al. | 726/22 |

(Continued)

OTHER PUBLICATIONS

Anonymous, "Distance between Points on the Earth's Surface," downloaded on Jun. 30, 2017 from https://www.math.ksu.edu/~dbski/writings/haversine.pdf, (4 pgs).
Chronograf product description, downloaded from https://www.influxdata.com/, 2017 (3 pgs).
Elasticsearch product description, downloaded on Jun. 30, 2017, from https://www.elastic.co/products/elasticsearch (8 pgs).
(Continued)

*Primary Examiner* — Noura Zoubair
(74) *Attorney, Agent, or Firm* — Hayes Soloway P.C.

(57) ABSTRACT

An apparatus for distributed correlation of RF information includes a radio having an RF transceiver and sensor in communication with the radio. The sensor has a collector for extracting signal data from the radio and a correlator for correlating the extracted signal data with sensor correlation data stored within a database within the sensor to detect an anomaly in the extracted signal data. When an anomaly is detected in the extracted signal data, a computerized service processing device receives the correlated extracted signal data from the sensor and executes one or more of an alert process to alert a user of the detected anomalies and an updating process to a correlation sub-system within the computerized service processing device, where the detected anomaly is curated and transmitted to the database of the sensor device to update the sensor correlation data stored therein.

19 Claims, 10 Drawing Sheets

(51) Int. Cl.
*H04W 12/06* (2009.01)
*H04B 17/309* (2015.01)
*H04B 1/38* (2015.01)

(56) References Cited

U.S. PATENT DOCUMENTS

| | | | |
|---|---|---|---|
| 9,628,958 B1* | 4/2017 | McBurney | H04W 4/027 |
| 2014/0372813 A1* | 12/2014 | Shin | G06F 11/076 |
| | | | 714/704 |
| 2016/0072597 A1* | 3/2016 | Carbajal | H04L 27/0006 |
| | | | 375/340 |
| 2016/0093187 A1 | 3/2016 | Zhang et al. | G08B 17/06 |
| 2016/0381545 A1* | 12/2016 | Wang | H04W 12/12 |
| | | | 455/434 |

OTHER PUBLICATIONS

ETSI TS 102 932-1 V1.1.1 Technical Specification, European Telecommunications Standards Institute 2011 (11 pgs).
Graphite product description, downloaded on Jun. 30, 2017, from https://graphiteapp.org (6 pgs).
GSM 03.03 Technical Specification, European Telecommunications Standards Institute, Mar. 1996 (22 pgs).
InfluxDB product description, downloaded from https://www.influxdata.com/, 2017 (3 pgs).
Kibana product description, downloaded on Jun. 30, 2017, from https://www.elastic.co/products/kibana (9 pgs).
OpenCelliD, "The world's largest Open Database of Cell Towers," Frequently Asked Questions, downloaded on Jun. 30, 2017, from https://opencellid.org. (3 pgs).

* cited by examiner

```
{
"platform":"PLATFORM-NAME",
"scan_finish":"2016-05-07 04:14:30",
"scan_location":"SCAN_LOCATION",
"site_name":"SITE_NAME",
"scanner_public_ip":"0.0.0.0",
"scan_results":[
  {
  "channel_detect_threshold":"279392.605625",
  "power":"400160.02",
  "final_freq":"869176168",
  "mod_freq":"23832.0",
  "band":"GSM-850",
  "sample_rate":"270833.002142",
  "gain":"80.0",
  "base_freq":"8692000000.0",
  "device":"0: Generic RTL2832U OEM",
  "modifier":"",
  "channel":"12"
  },
  {
  "channel_detect_threshold":"279392.605625",
  "power":"5909624.47",
  "final_freq":"869176168",
  "mod_freq":"23832.0",
  "band":"GSM-850",
  "sample_rate":"270833.002142",
  "gain":"80.0",
  "base_freq":"8692000000.0",
  "device":"0: Generic RTL2832U OEM",
  "modifier":"",
  "channel":"128"
  },
  {
  "channel_detect_threshold":"279392.605625",
  "power":"400160.02",
  "final_freq":"874376406",
  "mod_freq":"23594.0",
  "band":"GSM-850",
  "sample_rate":"270833.002142",
  "gain":"80.0",
  "base_freq":"8744000000.0",
  "device":"0: Generic RTL2832U OEM",
  "modifier":"",
  "channel":"154"
  }
],
"scan_start":"2016-05-07 04:10:35",
"event_timestamp":"2016-05-07 04:10:35",
"scan_program":"kalibrate",
"scanner_name":"DEVICE-ID"
}
```

FIG. 3B

```
[('scan',
{'event_timestamp': '2016-05-07 04:10:35',
'platform': 'PLATFORM-NAME',
'scan_finish': '2016-05-07 04:14:30',
'scan_location': 'SCAN_LOCATION',
'scan_program': 'Kalibrate',
'scan_results': [{'band': 'GSM-850',
  'base_freq': 8692000000.0,
  'channel': '12',
  'channel_detect_threshold': '279392.605625',
  'device': '0: Generic RTL2832U OEM',
  'final_freq': '869176168',
  'gain': '80.0',
  'mod_freq': 23832.0,
  'modifier': '.',
  'power': '5909624.47',
  'sample_rate': '270833.002142'},
 {'band': 'GSM-850',
  'base_freq': 8692000000.0,
  'channel': '128',
  'channel_detect_threshold': '279392.605625',
  'device': '0: Generic RTL2832U OEM',
  'final_freq': '869176168',
  'gain': '80.0',
  'mod_freq': 23832.0,
  'modifier': '.',
  'power': '5909624.47',
  'sample_rate': '270833.002142'},
 {'band': 'GSM-850',
  'base_freq': 8744000000.0,
  'channel': '154',
  'channel_detect_threshold': '279392.605625',
  'device': '0: Generic RTL2832U OEM',
  'final_freq': '874376406',
  'gain': '80.0',
  'mod_freq': 23594.0,
  'modifier': '.',
  'power': '400160.02',
  'sample_rate': '270833.002142'}],
'scan_start': '2016-05-07 04:10:35',
'scanner_name': 'DEVICE-ID',
'scanner_public_ip': '0.0.0.0',
'site_name': 'SITE_NAME'}),
('kal_channel',
{'arfcn_int': 12,
'band': 'GSM-850',
'channel': '12',
'final_freq': '869176168',
'gain': '80.0',
'power': 11590962447,
'sample_rate': '270833.002142',
'scan_finish': '2016-05-07 04:14:30',
'scan_program': 'Kalibrate',
'scan_start': '2016-05-07 04:10:35',
'scanner_public_ip': '0.0.0.0',
'site_name': 'SCAN_LOCATION'}),
('kal_channel',
{'arfcn_int': 128,
'band': 'GSM-850',
'channel': '128',
'final_freq': '869176168',
'gain': '80.0',
'power': 5909624.47,
'sample_rate': '270833.002142',
'scan_finish': '2016-05-07 04:14:30',
'scan_program': 'Kalibrate',
'scan_start': '2016-05-07 04:10:35',
'scanner_public_ip': '0.0.0.0',
'site_name': 'SCAN_LOCATION'}),
('kal_channel',
{'arfcn_int': 154,
'band': 'GSM-850',
'channel': '154',
'final_freq': '874376406',
'gain': '80.0',
'power': 400160.02,
'sample_rate': '270833.002142',
'scan_finish': '2016-05-07 04:14:30',
'scan_program': 'Kalibrate',
'scan_start': '2016-05-07 04:10:35',
'scanner_public_ip': '0.0.0.0',
'site_name': 'SCAN_LOCATION'})]
```

FIG. 3C

```
{
"details":"ARFCN 12 over threshold at SCAN_LOCATION. Observed: 11590962447",
"type":"alert",
"id":200,
"event_timestamp":"2017-06-15T02:39:48.264531",
"site_name":"SCAN_LOCATION"
}
```

FIG. 3D

```
{
"band": "",
"GSM850_MODE",
"platform": "",
"PLATFORM-NAME",
"scan_finish": "2016-05-07 02:36:50",
"scan_location": "",
"SCAN_LOCATION",
"scan_program": "",
"GSM_MODEM",
"scan_results": [
    {
    "arfcn": "0154",
    "bsic": "12",
    "cell": "0",
    "cellid": "000f",
    "lac": "178d",
    "mcc": "310",
    "mnc": "411",
    "rla": "00",
    "rxl": "33",
    "rxq": "00",
    "ta": "255",
    "txp": "05"
    },
    {
    "arfcn": "0128",
    "bsic": "30",
    "cell": "1",
    "cellid": "0010",
    "lac": "178d",
    "mcc": "310",
    "mnc": "411",
    "rxl": "20"
    },
    {
    "arfcn": "0179",
    "bsic": "00",
    "cell": "2",
    "cellid": "76e2",
    "lac": "178d",
    "mcc": "310",
    "mnc": "411",
    "rxl": "10"
    },
    {
    "arfcn": "0181",
    "bsic": "51",
    "cell": "3",
    "cellid": "1208",
    "lac": "178d",
    "mcc": "310",
    "mnc": "411",
    "rxl": "10"
    },
    {
    "arfcn": "0237",
    "bsic": "00",
    "cell": "4",
    "cellid": "ffff",
    "lac": "0000",
    "mcc": "",
    "mnc": "",
    "rxl": "31"
    },
    {
    "arfcn": "0238",
    "bsic": "00",
    "cell": "5",
    "cellid": "ffff",
    "lac": "0000",
    "mcc": "",
    "mnc": "",
    "rxl": "23"
    },
    {
    "arfcn": "0236",
    "bsic": "00",
    "cell": "6",
    "cellid": "ffff",
    "lac": "0000",
    "mcc": "",
    "mnc": "",
    "rxl": "23"
    }
],
"scan_start": "",
"scanner_name": "DEVICE-ID",
"scanner_public_ip": "66.18.61.61",
"site_name": "SITE_NAME"
}
```

SYSTEMS AND RELATED METHODS FOR DETECTION, TIERED CORRELATION, AND NOTIFICATION OF RADIO FREQUENCY (RF) ANOMALIES

CROSS REFERENCE TO RELATED APPLICATION

This application claims benefit of U.S. Provisional Application Ser. No. 62/352,424 entitled, "System for detection, tiered correlation, and notification of RF anomalies" filed Jun. 20, 2016, the entire disclosure of which is incorporated herein by reference.

FIELD OF THE DISCLOSURE

The present disclosure is generally related to RF signal anomaly detection and processing, and more particularly, is related to systems and related methods for detection, tiered correlation, and notification of RF anomalies.

BACKGROUND OF THE DISCLOSURE

In the modern age of wireless communications, it is difficult to ensure that networks are secured from surveillance, intrusion, or manipulation. Various devices and systems have been proposed for detecting when a communication channel has been compromised. Some systems use rules-based engines which analyze security events generated by network devices, where the security events are aggregated and analyzed to detect intrusion. Other systems have used threat scores derived from threat feeds to represents the severity of network intrusion.

In these conventional systems, detection of a network being compromised involves processing and analyzing very large quantities of data received from a large number of devices. The various devices transmit the data to a centralized server or comparable service-level platform having a high-powered processor for high-performance processing, where the processing and analysis can be carried out. However, even high-powered processing devices are subject to errors, slow processing or bottlenecks, and failure during processing which is computationally expensive or processor hungry, especially as the number of individual devices sending data to be analyzed increases to scale. Thus, even a centralized computing device equipped with the highest processor performance possible is susceptible to errors, slow processing, and failures in due time as the user base grows.

Thus, a heretofore unaddressed need exists in the industry to address the aforementioned deficiencies and inadequacies.

SUMMARY OF THE DISCLOSURE

Embodiments of the present disclosure provide an apparatus, system, and method for distributed correlation of RF information. Briefly described, in architecture, one embodiment of the apparatus, among others, can be implemented as follows. At least one radio device has an RF transceiver. At least one sensor device is in communication with the at least one radio device. The at least one sensor device has a collector for extracting signal data from the at least one radio device and a correlator for correlating the extracted signal data with sensor correlation data stored within at least one database within the at least one sensor device to detect at least one anomaly in the extracted signal data. A computerized service processing device has at least one processor and a non-transitory memory. When the at least one anomaly is detected in the extracted signal data, the computerized service processing device receives the correlated extracted signal data from the at least one sensor device and executes at least one of: an alert process to alert a user of the detected anomalies, and an updating process to a correlation subsystem within the computerized service processing device, wherein the at least one detected anomaly is curated and transmitted to the at least one database of the at least one sensor device to update the sensor correlation data stored therein.

The present disclosure can also be viewed as providing an apparatus, system, and method for anomaly detection in a radio frequency (RF) signal. Briefly described, in architecture, one embodiment of the apparatus, among others, can be implemented as follows. A radio device has an RF transceiver. A sensor device is physically connected to, and in electronic communication with, the radio device. The sensor device has a collector for extracting signal data from the radio device. A sensor correlation database is stored on a non-transitory memory of the sensor device. A correlator correlates the extracted signal data to detect at least one anomaly in the extracted signal data. The extracted signal data is correlated with sensor correlation data stored within the sensor correlation database and geolocation data of the sensor device.

The present disclosure can also be viewed as providing methods for distributed correlation of radio frequency (RF) information. In this regard, one embodiment of such a method, among others, can be broadly summarized by the following steps: providing at least one sensor device in communication with at least one radio device having an RF transceiver; extracting signal data from the at least one radio device with a collector of the at least one sensor device; correlating the extracted signal data with sensor correlation data stored within at least one database within the at least one sensor device to detect at least one anomaly in the extracted signal data; and transmitting the correlated extracted signal data to a computerized service processing device when at least one anomaly is detected, wherein the computerized service processing device has at least one processor and a non-transitory memory, and wherein, after receiving the correlated extracted signal data from the at least one sensor device, the computerized service processing device executes at least one of: an alert process to alert a user of the detected anomalies; and an updating process to a correlation sub-system within the computerized service processing device, wherein the at least one detected anomaly is curated and transmitted to the at least one database of the at least one sensor device to update the sensor correlation data stored therein.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the FIG. 1, which is a diagrammatical illustration of an apparatus for distributed correlation of RF information, in accordance with a first exemplary embodiment of the present disclosure.

FIG. 3B depicts an example of a scan document produced by the apparatus for distributed correlation of RF information of FIG. 3A, in accordance with the first exemplary embodiment of the present disclosure.

FIG. 3C depicts an example of the results of decomposer processing ARFCN-specific documents produced by the apparatus for distributed correlation of RF information of FIG. 3A, in accordance with the first exemplary embodiment of the present disclosure.

FIG. 3D depicts an example of an alert generated by the apparatus for distributed correlation of RF information of FIG. 3A, in accordance with the first exemplary embodiment of the present disclosure.

FIG. 4B depicts an example of resulting data from the data object generation of the apparatus for distributed correlation of RF information of FIG. 4A, in accordance with the first exemplary embodiment of the present disclosure.

FIG. 4C depicts an example of the output of the decomposer of the apparatus for distributed correlation of RF information of FIG. 4A, in accordance with the first exemplary embodiment of the present disclosure.

DETAILED DESCRIPTION

To improve over the prior art, a system and method for detection, tiered correlation, and notification of RF anomalies and other information is provided. The system uses a distributed, multi-tier approach, which can generally be understood as having two layers, the sensor layer comprised of a radio, a sensor device, and other components, and a service layer comprised of a service interface for processing, user interaction, and access to open source data. In general terms, the sensor layer may extract signal data, such as RF signal data and wireless network metadata, from radio devices, correlate the information derived from the radio devices with databases maintained on the sensor device itself, and transmit the resulting enriched information to the service layer. The service layer may aggregate telemetry data produced by the sensor devices, perform analysis of these aggregated metrics, such as time-series or behavioral analysis, and alert a user to anomalies detected by the sensor device and/or correlation subsystems in the service layer.

Figure 1:
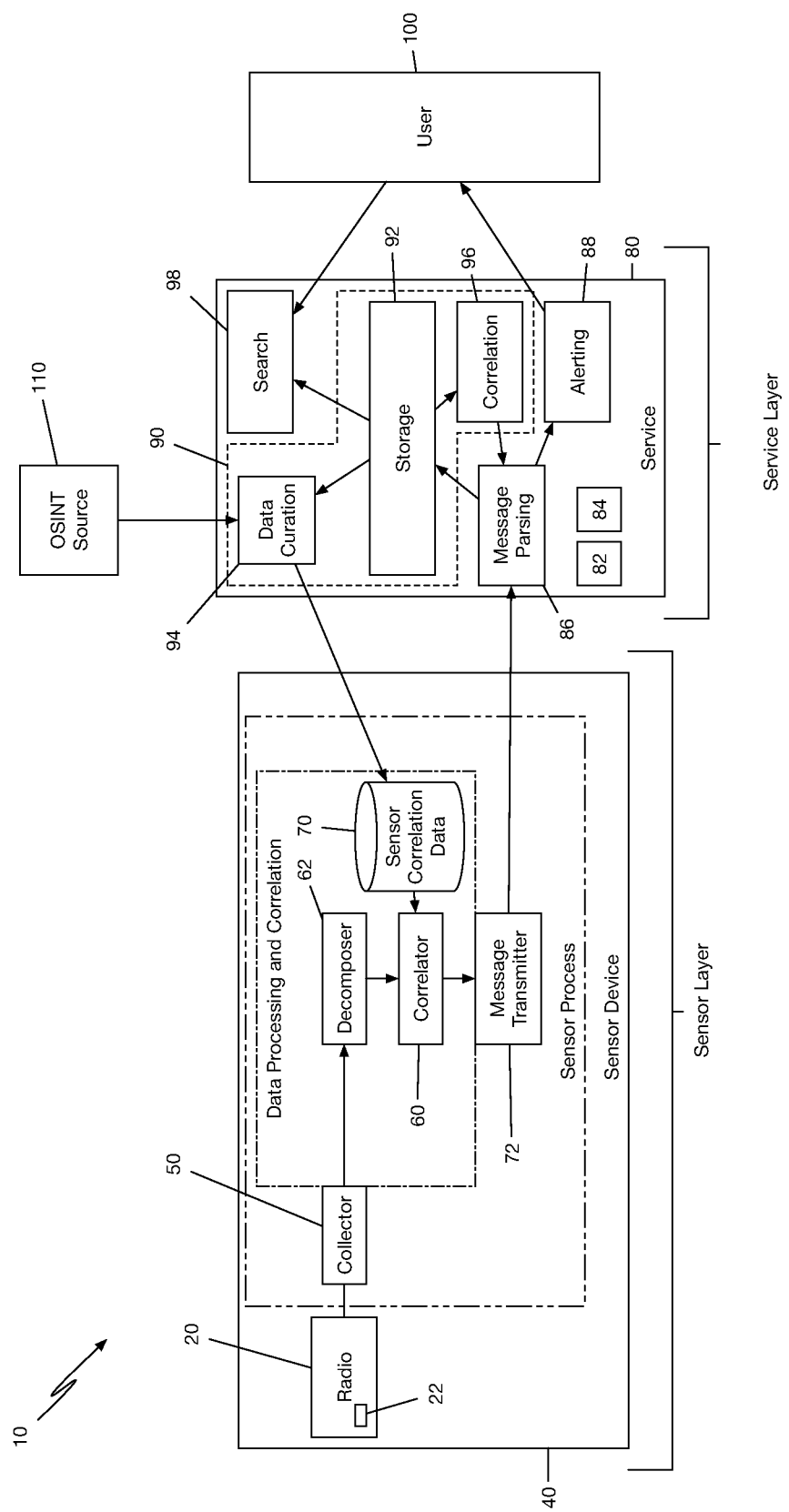

The architecture and components of the sensor layer and service layer are described in greater detail in FIG. 1, which is a diagrammatical illustration of an apparatus for distributed correlation of RF information 10, in accordance with a first exemplary embodiment of the present disclosure. The apparatus for distributed correlation of RF information 10 may be referred to simply as 'apparatus 10', and it includes, in the sensor layer, at least one radio device 20 having an RF transceiver 22. At least one sensor device 40 is in communication with the at least one radio device 20. Among other components, the sensor device 40 has a collector 50 which extracts signal data from the at least one radio device 20 and a correlator 60 which correlates the extracted signal data with sensor correlation data stored within at least one database, e.g., a sensor correlation database 70, within the sensor device 40 to detect at least one anomaly in the extracted signal data. In the service layer, the apparatus 10 includes a computerized service processing device 80 having at least one processor 82 and a non-transitory memory 84. When the at least one anomaly is detected in the extracted signal data in the sensor layer, the computerized service processing device 80 receives the correlated extracted signal data from the sensor device 40. The computerized service processing device 80 then executes an alert process to alert a user of the detected anomalies and/or an updating process to a correlation subsystem 90 within the computerized service processing device 80, wherein the at least one detected anomaly is curated and transmitted to the sensor correlation database 70 of the at least one sensor device 40 to update the sensor correlation data stored therein.

The sensor device 40 is a physical device that performs the functions required by the sensor process and related sub-processes. The sensor device 40 includes various physical components, including the radio device 20 having the RF transceiver 22, and other radio hardware components to make observations as to the current state of RF networks based on data received from the radio device 20. The radio device 20 within the sensor device 40 may receive and/or transmit information over RF networks with the RF transceiver 22 therein. Commonly, the radio device 20 is physically attached to the sensor device 40, or embedded in the sensor device 40, depending on design of the apparatus 10. For example, the sensor device 40 may be included with or within cellular telephones or similar mobile electronic communication devices, which have RF communication capabilities. Every sensor device 40 will include at least one radio device 20, and in some situations, multiple radio devices 20 may be included in a sensor device 40.

The sensor device 40 may be capable of executing sensor processing techniques with components of the sensor device 40, including the collector 50, a data processing a correlation sub-processing system having the correlator 60, a decomposer 62, and the sensor correlation database 70, and a message transmitter 72. The components used for the sensor processing and the processing subsystem for performing data processing and correlation are identified in FIG. 1, where the sensor processing may define the logical boundary within which all data processing for the sensor process occurs and the data processing and correlation subsystem may define the logical boundary that encloses the components of the sensor device 40 which transform and correlate information.

The collector 40 is in communication with the radio device 20 and may manage all communications with the radio device 20 and send the information received from the radio device 20 to the decomposer 62. There may be a compatible collector 50 for every type of radio device 20 attached to the sensor device 40, as is further described relative to FIG. 2. The decomposer 62 may reduce the information produced by the collector 50 to a format that is acceptable for correlation in the data processing and correlation subsystem. For example, the decomposer 62 may translate one message received from the collector 50 into a different data format, or it may create multiple messages from the same input from the collector 50, either or which may provide for more precise correlation. The correlator 60 may receive or consume the decomposed information from the decomposer 62 and compare them against prior observations and/or sensor correlation data contained in the sensor correlation database 70, which may include multiple databases interfaces with one another, depending on design of the apparatus 10. As will be discussed further relative to FIGS. 2-5, comparison of the information received by the correlator 60 to prior observations may include prior observations made by the sensor device 40, such as tracking changes in GPS measurements or other measurements taken by the sensor device 40. The sensor correlation database 70 may store and manage the sensor correlation data, accessible to and used by the correlator 60 to determine if observations of the extracted signal data from the radio device 20 are anomalous. As described further in detail later, this information may be produced by processes in the service layer, and the sensor device 40 may periodically retrieve this data from the service layer.

The message transmitter 72, which may be a software process within the sensor device 40 or a hardware component capable of transmitting messages, which transmits messages to the message parsing unit 86, may receive the output from the correlator 60 and transmit that information, as well as other information received from the decomposer 62 or other components of the sensor device, to the computerized service processing device 80 of the service layer. The message transmitter 72 may include a variety of different wired or wireless messaging mediums which are capable of transmitting data from the sensor device 40. Additionally, the message transmitter 72 may include multiple components therein which function in concert to transmit messages. For example, the message transmitter 72 may include component(s) which records messages in log files and other component(s) that transmits the log files to the computerized service processing device 80. Utilizing multiple components within the message transmitter 72 may mitigate data loss in the event of an unexpected loss of power or connectivity within the sensor device 40.

In the service layer, the computerized service processing device 80 may include various hardware, firmware, and software components, including the processor 82 and the non-transitory memory 84, as well as other, commonly-used computing components, e.g., a power supply, communication devices, input/output devices, databases, security features, processing algorithms, and other components known in the art. The data transmitted to the computerized service processing device 80 from the message transmitter 72 of the sensor device 40 may be received at a message parsing unit 86, which may be a software messaging unit, and may generally receive all information transmitted to the service layer from the sensor device 40. The message parsing unit 86 may direct the alert-type messages it receives to an alerting unit 88 and/or transmit the alert-type messages or other data to a storage database 92 of the correlation subsystem 90. The alert-type messages may be identified as such by the correlator 60 of the sensor device 40. Upon receipt of those messages in the alerting unit 88, it may forward the alert-type messages to a user 100. The user 100 may be a human user or a process acting on the part of a human user, which receives alerts and interacts with the apparatus 10. The alerting unit 88 may forward the alert-type messages to a user 100 directly or indirectly by using an alerting service managed by the user 100. An example of an alerting service which the user 100 can employ is an instant messaging platform, e.g., Slack, which can be configured to send alerts to users.

When the information received in the message parsing unit 86 is transmitted to the correlation subsystem 90, it may be received by the storage database 92 which is connected to a data curation unit 94. The data curation unit 94 may consume information from an Open Source Intelligence (OSINT) database 110 and the storage database 92 to create a set of information that can be used by the sensor device 40 to populate the sensor correlation database 70, e.g., to add to, remove, or otherwise update the sensor correlation data within the sensor correlation database 70. This information may include RF network metadata or other relevant information. The OSINT database 110 may include one or more freely-available sources for relevant information on RF anomalies, such as, for example, the OpenCellID database (http://opencellid.org). The data curation unit 94 may retrieve information in the OSINT database 110 and the data within the storage database 92, and process that information as needed to update the sensor correlation data.

The computerized service processing device 80 may also include a correlation unit 96 which retrieves information from the storage database 92 and detects anomalies based on observations over time and/or across multiple sensors. The correlation unit 96 may use various algorithms and logical processing to detect anomalies, such as, for example, application of the Holt-Winters algorithm to a time-series dataset representing signal strength on a radio channel over time. A search unit 98 is also included in the computerized service processing device 80. The search unit 98 may allow the user 100 access to the computerized service processing device 80, such as to browse and retrieve information from the storage database 92 of the correlation subsystem 90.

In operation, and using the components described in FIG. 1, the sensor device 40 may consume signal data and other information produced by the radio device 20. The signal data is collected by the collector 50 and then transmitted to the decomposer 62, where the signal data is parsed such that distinct features can be extracted, such as channel metadata, signal strength, and other features of the signal data, which is then organized into a structured data format, such as data points. This set of extracted signal data points are then passed to a correlator 60, where it is compared against the archives of sensor correlation data within the sensor correlation database 70, contained and stored on the sensor device 40 itself. The sensor correlation database 70 contains information relevant to known RF anomalies or characteristic of RF anomalies, such as known transmitter locations and expected channel metadata observations, which may be populated from the OSINT database 110 and prior system-internal observations to compile a database of RF network metadata. Thus, the correlator 60 may correlate the extracted signal data against the sensor correlation data within the sensor correlation database 70 and against measurements recorded recently by the sensor device 40 itself, such as against measured geolocation data. However, it is noted that correlation against measured data of the sensor device 40 may be limited to measurements made by the sensor device 40 before the current run-cycle, i.e., such that the correlator 60 does not correlate against measurements that occurred before the sensor device 40 was last rebooted. If correlation against measurements is not limited to the current run-cycle, the sensor device 40 may be required to build and maintain a rich dataset of its own prior observations before correlation can proceed, which may create a capability disadvantage if the sensor device 40 needs to be replaced due to the possible significant wait time for the sensor device 40 to rebuild a rich set of prior measurements and observations.

By comparison and correlation of the extracted signal data to the information in the sensor correlation database 70, the correlator 60 can identify known or likely anomalies within the extracted signal data, which indicates possible manipulation of the RF signals of the radio device 20. Manipulation of the RF signals may be caused by a variety of conditions, including an unsecure or compromised RF signal. Once an RF anomaly is detected by the correlator 60, the correlator 60 creates additional messages identifying the anomaly, and the message transmitter 72 of the sensor device 40 then transmits the messages to the message parsing unit 86 of the computerized service processing device 80. In addition to anomaly-identified data and alert messages (created by the correlator 60) being transmitted, the message transmitter 72 may also transmit the original structured signal data (generated by the decomposer 62) from the radio device 20 and the extracted signal data.

In the service layer, when the message parsing unit 86 receives a message from a sensor device 40, it may record the original message, in its entirety, and make it available for the user via search unit 98. The computerized service processing device 80 then extracts and records measurements from the incoming message, into a time-series database, which may be stored within the storage unit 92 or elsewhere. The correlation unit 96 then queries the storage unit 92 looking for anomalies, such as by performing analysis of the time-series data to perform a service-level detection of anomalies using threshold-based analysis, heuristic analysis, and/or other analysis.

The service-level detection of anomalies may be a secondary level of anomaly detection that occurs in the service layer, which is performed in addition to the sensor-level correlation occurring in the sensor device 40. This secondary anomaly detection in the computerized service processing device 80 may be especially useful for further detection of anomalies within data produced by multiple sensor device 40, e.g., by correlation and analysis of the data from multiple sensors to detect anomalies which may have not been detected within the correlator 40 of one sensor device 40. If anomalies are detected, the correlation unit 96 may create an alert-type message, and transmits the alert-type message to message parsing unit 86, which can be transmitted to the user 100 such that the user 100 can be alerted of anomalies in the RF signal data detected at the sensor-level or service-level. After receiving the alerts, the user 100 may be able to access the storage unit 92 through the search unit 98 for the purposes of ad-hoc analysis of the detected anomalies. The anomaly messages received from the sensor device 40 may also be used to maintain an updated version of the sensor correlation data within the sensor correlation database 70 in the sensor device 40, which the correlator 60 of the sensor device 40 uses to perform sensor-level correlation for anomaly detection.

The apparatus, systems, and related methodologies disclosed herein may provide benefits in successfully detecting anomalies in RF signals, such as within wireless communication networks. Accordingly, by detecting cellular network anomalies, it may be possible for a user to recognize that his or her cellular device is being surveilled or has been compromised. Moreover, this disclosure provides further benefits in handling such anomaly detection in such a way that can be successfully scaled to a large number of users. Commonly, large scale data processing is handled by powerful computers on the service side of a system, not on the users' individual devices. However, even large scale data processing is subject to errors, slow processing or bottlenecks, and failure during processing which is computationally expensive or processor hungry. Database comparisons can be very expensive as the volume of information increases. The subject invention provides a solution to the issue of scale on the service-side by processing computationally expensive data on the individual user devices, for example, by pushing a section of the feed database which is relevant to the local of an individual user's sensor. Thus, the present invention is capable of taking the load off of a central service, thereby allowing it to handle more information, more gracefully and less expensively.

Additionally, the subject invention also offers the benefit of anomaly detection during network outages. In the service layer, the subject invention is able to curate feeds for consumption by sensor devices asynchronously, such that there are no processes dependent on event or message processing that would be held up if that service were running slowly due to an unnaturally high volume of events. Each sensor device does the work of feed comparison, and the curation of data in the service layer builds the feed. Another benefit of the subject invention is that the work of feed comparison happens on the sensor device itself, so the work required to catch up on a volume of events accumulating over a period of network disconnect is less than if the feed comparison relied fully on the service layer. In the subject invention, during a network outage, the sensor devices are still able to perform feed comparison in the sensor layer, and the resulting correlated information is forwarded to the service layer when network connectivity is restored.

Figure 2:
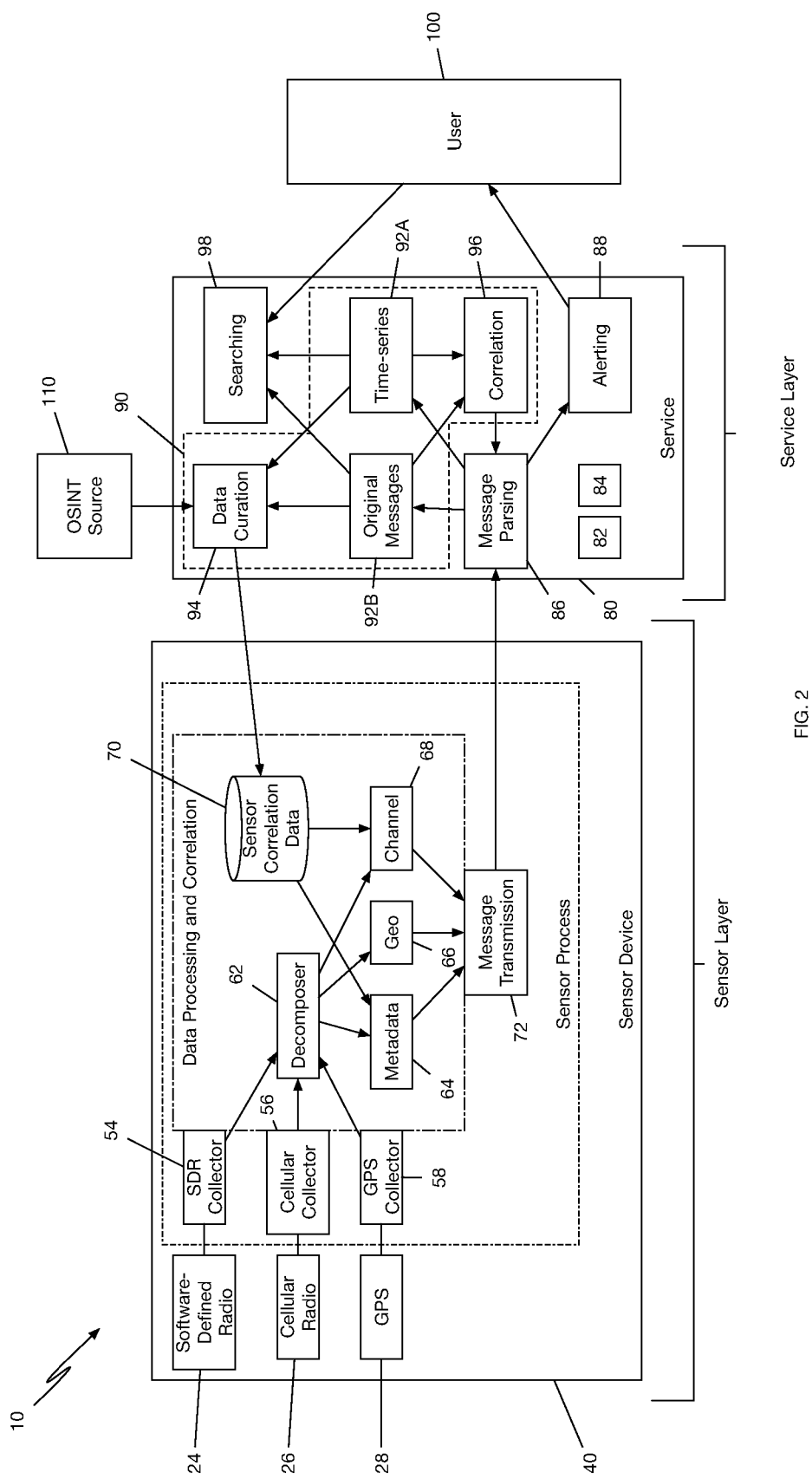
FIG. 2 is a diagrammatical illustration of the apparatus for distributed correlation of RF information of FIG. 1, in accordance with the first exemplary embodiment of the present disclosure.

FIG. 2 is a diagrammatical illustration of the apparatus for distributed correlation of RF information 10 of FIG. 1, in accordance with the first exemplary embodiment of the present disclosure. The apparatus 10 of FIG. 2 may include the structure and functions disclosed in FIG. 1, as well as include additional details and variations on the apparatus 10, which are illustrated in FIG. 2. For example, FIG. 2 illustrates the three specific radio devices, including a software-defined radio (SDR) 24, a cellular radio 26, and a Global Positioning System (GPS) radio 28. The SDR 24 may be a radio device which is able to have its operating characteristics, such as frequency, for example, controlled by a computer. SDR devices 24 also rely on computer software for signal processing. The cellular radio 26 may be a radio device constructed specifically for the purpose of communicating on a cellular network. The cellular radio 26 may be different from the SDR 24, in that, it is designed for a single purpose, and does not require a computer for tuning or signal processing, as that functionality is built-in. The GPS radio 28 may be a device used to receive transmissions from specific satellites for the purpose of providing a precise location. The GPS radio 28 can be used in the sensor device 40 for tracking position over time, which can be used to detect GPS spoofing and add context for correlating RF observations against the sensor correlation database 70. As is known in the art, GPS spoofing may include an attempt to deceive a GPS receiver by broadcasting incorrect GPS signals, structured to resemble a set of normal GPS signals, or a rebroadcast of genuine signals captured elsewhere or at a different time.

To interface with the different types of radios, the sensor device 40 may include a SDR collector 54, which controls the SDR device and produces information to be processed by the decomposer 62. In implementation, the SDR collector 54 may include two parts: a software tool that scans for cellular infrastructure, such as KALIBRATE, and a wrapper that makes the software tool accessible to software used by the sensor device 40. The cellular collector 56 may manage communication with the cellular radio 26 and issues queries to the cellular radio 26, consumes the response to the queries, and sends the response, in a structured format, to the decomposer 62. The GPS collector 58 manages communication with the GPS radio 28 and passes geolocation information to the decomposer 62. Accordingly, the decomposer 62 may reduce the input messages from SDR, cellular, and GPS collectors, 54, 56, 58 to a format more easily consumed by the correlators.

In contrast to FIG. 1 which uses an individual correlator, the apparatus 10 as described in FIG. 2 utilizes a metadata correlator 64, a geo correlator 66, and a channel correlator 68 to correlate data received from the collectors. The metadata correlator 64 may compare cellular network metadata, such as Cell Global ID or CGI, to the sensor correlation database 70 to determine as to whether or not the observations in the cellular network metadata are anomalous. For example, if a CGI (which is globally unique) has been recorded as being previously observed in Phoenix, Ariz. (as represented in the sensor correlation database 70), and it is later observed in San Francisco, Calif., this detection would be reported as an anomaly in the cellular data. In this example, the anomaly could indicate that a device is in use to intercept cellular communications or a nearby cell base station is incorrectly configured. The geo correlator 66 may process geographic position data from the decomposer 62, which originally comes from the GPS radio 28 via the GPS collector 58. The geo correlator 66 records the first observed position of the sensor device 40, in which the GPS radio 28 is embedded or connected to, and if subsequent observations are made which are beyond a configured distance threshold, an alert-type message is generated, and eventually passed to the message transmitter 72. The channel correlator 68 may process cellular channel related information, e.g., an Absolute Radio Frequency Channel Number (ARFCN), and may generate alert-type messages if certain channels are observed but not licensed in the area, as well as if the observed signal strength is over a configured threshold.

The sensor correlation database 70 and the message transmitter 72 may operate as discussed relative to FIG. 1, in that, the and the sensor correlation database 70 provides relevant information for the correlators to determine if an observation represents an anomaly, and the message transmitter 72 transmits messages to the message parsing unit 86 in the computerized service processing device 80 of the service layer. The computerized service processing device 80 may operate similar to as discussed relative to FIG. 1. The computerized service processing device 80 may communicate messages to a user 100 through an alerting unit 88, the user 100 may be able to access, browse, and/or retrieve information through a search unit 98, and the computerized service processing device 80 may receive information from an OSINT database 110.

As shown, the correlation subsystem 90 may include a storage unit that is separated into different storage systems. A time-series storage unit 92A may allow the user 100 and the correlation unit 96 to query for measurements over time. An original messages storage unit 92B may function as a data store that allows the original messages sent from all sensor devices 40 communicating with the computerized service processing device 80 to be searched using the searching unit 98 and queried for the purpose of correlating events over time. The correlation unit 96 can query the time-series unit 92A and the original messages unit 92B for the purpose of discovering behavioral anomalies. The data curation unit 94 may consume information from OSINT database 110, the time-series unit 92A, and the original messages unit 92B to create a set of information that the sensor device 40 can consume and use to populate the sensor correlation database 70. It is noted that the searching unit 98 can include the use of existing toolsets, such as those composed of KIBANA® and CRONOGRAF, or other tools or collections of tools which are capable of querying the time-series unit 92A and the original messages unit 92B. The original messages unit 92B can include the use of document storage engines, such as ELASTICSEARCH® or other tools. The time-series unit 92A can include the use of a time-series metrics tool, such as GRAPHITE® or INFLUXDB®, or others.

In operation of the apparatus 10 of FIG. 2, and in particular, when a cellular channel signal strength observation is made, the following process may occur. The SDR collector 54 may cause the SDR radio 24 to scan for cellular network base stations. Information produced by this scan is transmitted from the SDR collector 54 to decomposer 62. The decomposer 62 translates measurements from SDR collector 54 into a general format consumable by the channel correlator 68. This formatted data is then consumed by the channel correlator 68. Channel correlator 68 then queries the sensor correlation database 70 to ascertain if the observed channel is licensed to an operator in the vicinity of the sensor device 40. If a license exists in the sensor correlation database 70, only the formatted data that passed into the channel correlator 68 moves to the message transmitter 72. If there is no license for the observed channel on record in the sensor correlation database 70, and/or if the observed transmit power of the cellular base station is over the configured threshold of the sensor device 40, messages indicating the deviation from expected observations (alert-type messages for unlicensed frequency or power over threshold) are created and sent to the message transmitter 72. The message transmitter 72 sends all messages it receives to the message parsing unit 86 in the service layer.

Once in the service layer, the message parsing unit 86 records information generated by the sensor device 40 in the original messages storage unit 92B and extracts measurements from those messages for storage in the time-series storage unit 92A. Alert-type messages received by the computerized service processing device may be transmitted to the user 100 via the alerting unit 88. The correlation unit 96 performs statistical analysis of time-series data stored in time-series unit 92A and if anomalies are detected, e.g., where the transmit power is beyond the Holt-Winters-predicted range, for instance, alert-type messages are generated and passed to the message parsing unit 86, which records the alert-type message in original messages storage unit 92B and may transmit the alert-type message to the user 100 via the alerting unit 88. The user 100 may then use the searching unit 98 to research prior observations recorded in the original messages storage unit 92B or time-series storage unit 92A to further validate the alert generated by the correlation unit 96.

In another operation of the apparatus 10 of FIG. 2, specifically, when the cellular radio 26 reports metadata for the cellular network, the following process may occur. The cellular collector 56 receives information from cellular radio 26, which indicates the current serving base station (the base station that the cellular radio is currently associated with). This information passes through the decomposer 62, which formats the information into structured data that can be parsed by the metadata and channel correlators 64, 68. The original messages generated by the decomposer 62 are passed to the message transmitter 72. The metadata correlator 64 compares cellular network metadata against the sensor correlation data within the sensor correlation database 70 in the sensor device 40, and generates alerts for anomalies. The cellular network metadata may include a mobile country code (MCC), a mobile network code (MNC), a base station identify code (BSIC), a cell ID (CID), and a location area code (LAC), or others. Anomalies, in this case, may refer to a cellular base station's Cell Global ID having been observed at an earlier time in a distant location. Cell Global ID, or CGI, is composed from MCC+MNC+LAC+CID. Site-unique, the same CGI should never be observed in two different geographic regions. Anomalies, if any are detected, will be recorded in an alert-type message and passed to the message transmitter 72. The channel correlator 68 may use the ARFCN reported in the message coming from the decomposer 62 to determine if the frequency is licensed for use in the vicinity of the sensor device 40. If the frequency is not licensed for use in the area, an alert-type message is generated and passed to the message transmitter 72.

Alert-type messages received by the message parsing unit 86 may be passed to the user 100 through the alerting unit 88. Measurements are extracted from messages in the message parsing unit 86 and stored in the time-series storage unit 92A, and original messages are stored in original messages storage unit 92B in the computerized service processing device 80. The correlation unit 96 may then detect anomalies in the time-series storage unit 92A, and those anomalies will be sent to the message parsing unit 86, which may then be transmitted via alerting unit 88 to the user 100.

Figure 3A:
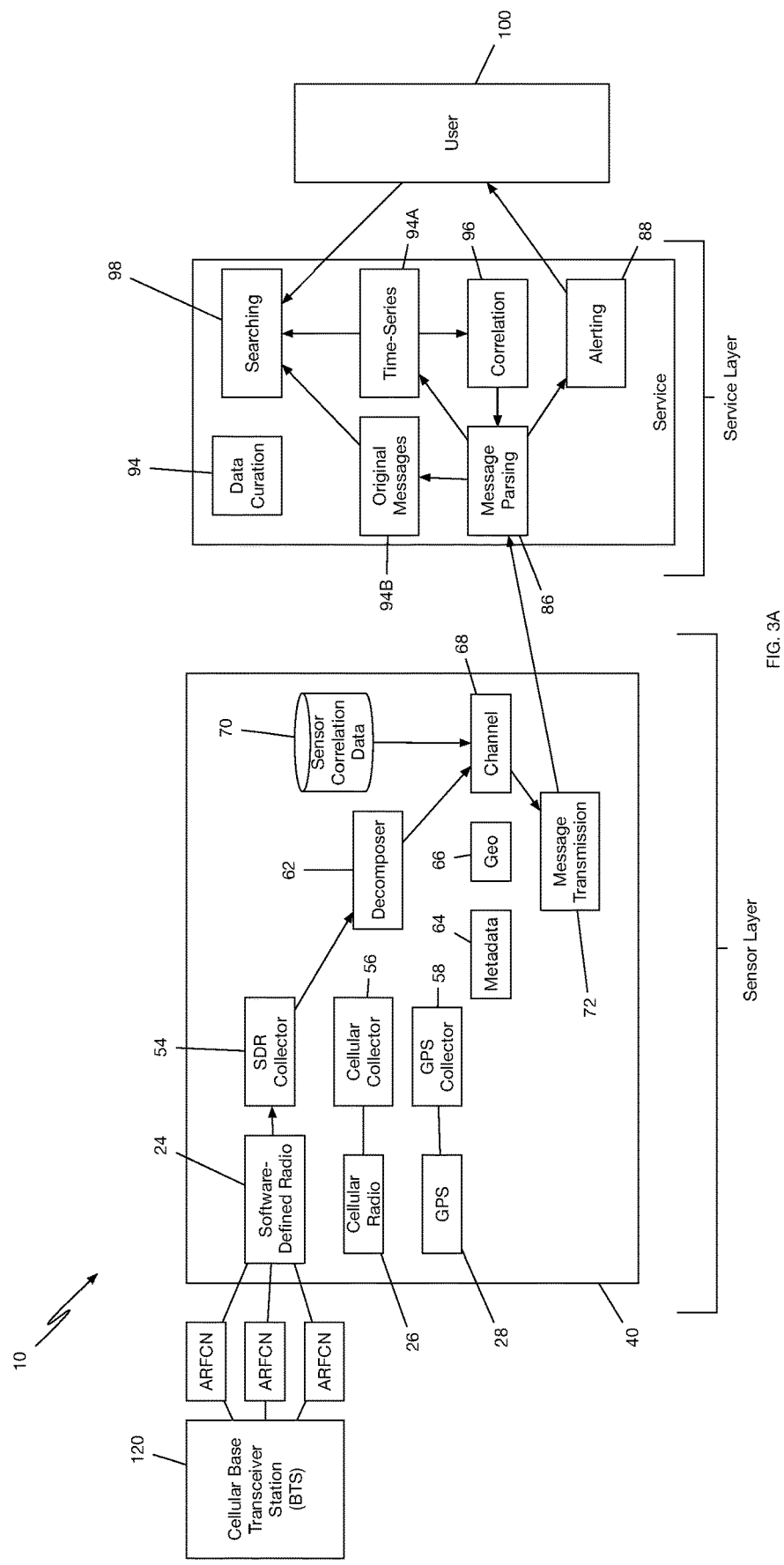
FIG. 3A is a diagrammatical illustration of the apparatus for distributed correlation of RF information of FIG. 2 depicting a process when cellular base stations are detected by the software-defined radio, in accordance with the first exemplary embodiment of the present disclosure.

FIG. 3A is a diagrammatical illustration of the apparatus for distributed correlation of RF information 10 of FIG. 2 depicting a process when cellular base stations 120 are detected by the SDR 24, in accordance with the first exemplary embodiment of the present disclosure. The apparatus 10 of FIG. 3A may include the components, structure, and functions disclosed in FIG. 2, the descriptions of which are provided relative to FIG. 2. An Absolute Radio Frequency Channel Number (ARFCN) is a number identifying a carrier frequency, as is known in the art. The SDR 24 is capable of detecting three ARFCNs and the SDR collector 54 may produce structured information containing, among other metadata, the ARFCN number and power measurement for all three ARFCNs. This structured information may be referred to as a scan document, and example of which is depicted in FIG. 3B. The scan document may be sent to the decomposer 62, which creates separate documents for each ARFCN. The original document, together with the newly-generated ARFCN-specific documents is queued for processing. An example of the results, as produced by the decomposer 62, is depicted in FIG. 3C.

It is noted that both the scan document and the original document with the newly-generated ARFCN-specific documents comes back from the decomposer 62 in a structure where the first item denotes the object type (in this case, "scan" and "kal_channel") and the second item is the contents of the data object itself. The "kal_channel" objects are sent to the channel correlator 68 and the "scan" type object is sent straight to message transmitter 72. The channel correlator 68 checks the "arfcn_int" value in each "kal_channel" object against the sensor correlation datab within the sensor correlation database 70 to ascertain if the frequency associated with the ARFCN is licensed for operation in range of the sensor. The channel correlator 68 also checks the "power" value against an alert threshold. If the alert threshold is exceeded, an alert is generated. An example of the alert generated is depicted in FIG. 3D.

The alert, together with the ARFCN-specific objects are sent to message transmitter 72, which forwards the messages up to the service layer. The sensor device 40 may send message to the computerized service processing device 80 in the service layer over a TCP/IP network or another communication protocol. The medium of communication, e.g., Ethernet, WiFi, cellular, etc. may vary, so long as bandwidth is sufficient to deliver the information to the computerized service processing device 80. When the computerized service processing device 80 receives the message via the message parsing unit 86, each message is sent to the original messages storage unit 92B. The message parsing unit 86 also sends time-series measurements to the time-series storage unit 92A. In the case of data originating from the SDR 24, the message parsing unit 86 extracts the "power" measurement for retention in the time-series storage unit 92A.

The correlation unit 96 may periodically examine recent measurements in the time-series storage unit 92A and compare the recent measurements to prior measurements, applying statistical methods like Holt-Winters to determine if recent measurements fall too far from the forecasted value. If the correlation unit 96 discovers anomalous behavior, an alert is generated and passed to message parsing unit 86. The message parsing unit 86 may forward all messages to an external system, but typically forwards only alerts to the user 100 via the alerting unit 88. Upon receipt of the message, the user 100 may choose to investigate by accessing the searching unit 98, which exposes prior messages and measurements from all sensor device 40 interfaced with the apparatus 10.

It is noted that alerts may be generated both at the sensor-level, e.g., by the channel correlator 68 per FIG. 3A, and at the service-level by the correlation unit 96. It may be preferable for the most computationally expensive analysis, i.e., the analysis which is most processor heavy, to be done on the sensor level, and these alerts are not subject to further correlation before being delivered to the user 100. The sensor device 40 may populate its sensor correlation data within the sensor correlation database 70 with information that applies only to the geographic region in which it operates. Thus, the apparatus 10 may not need to have the information for all geographic locations present on the sensor device 40, but only the information pertinent to the area the sensor device 40 is intended to protect. This may be an added benefit of distributed, multi-tier correlation of the present disclosure.

Figure 4A:
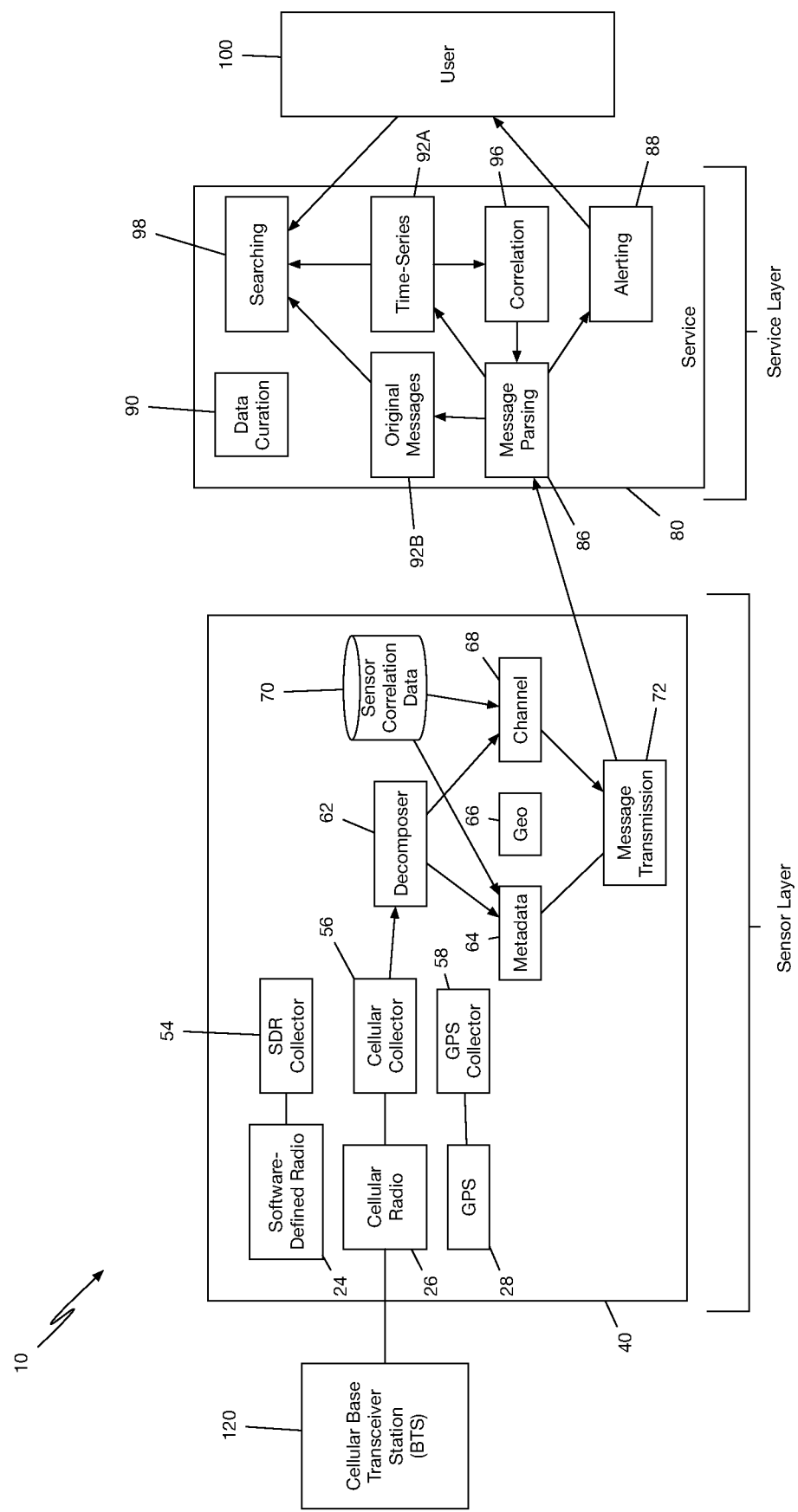
FIG. 4A is a diagrammatical illustration of the apparatus for distributed correlation of RF information of FIG. 2 depicting a process when a cellular radio is associated with a Base Transceiver Station, in accordance with the first exemplary embodiment of the present disclosure.
Figure 4C:
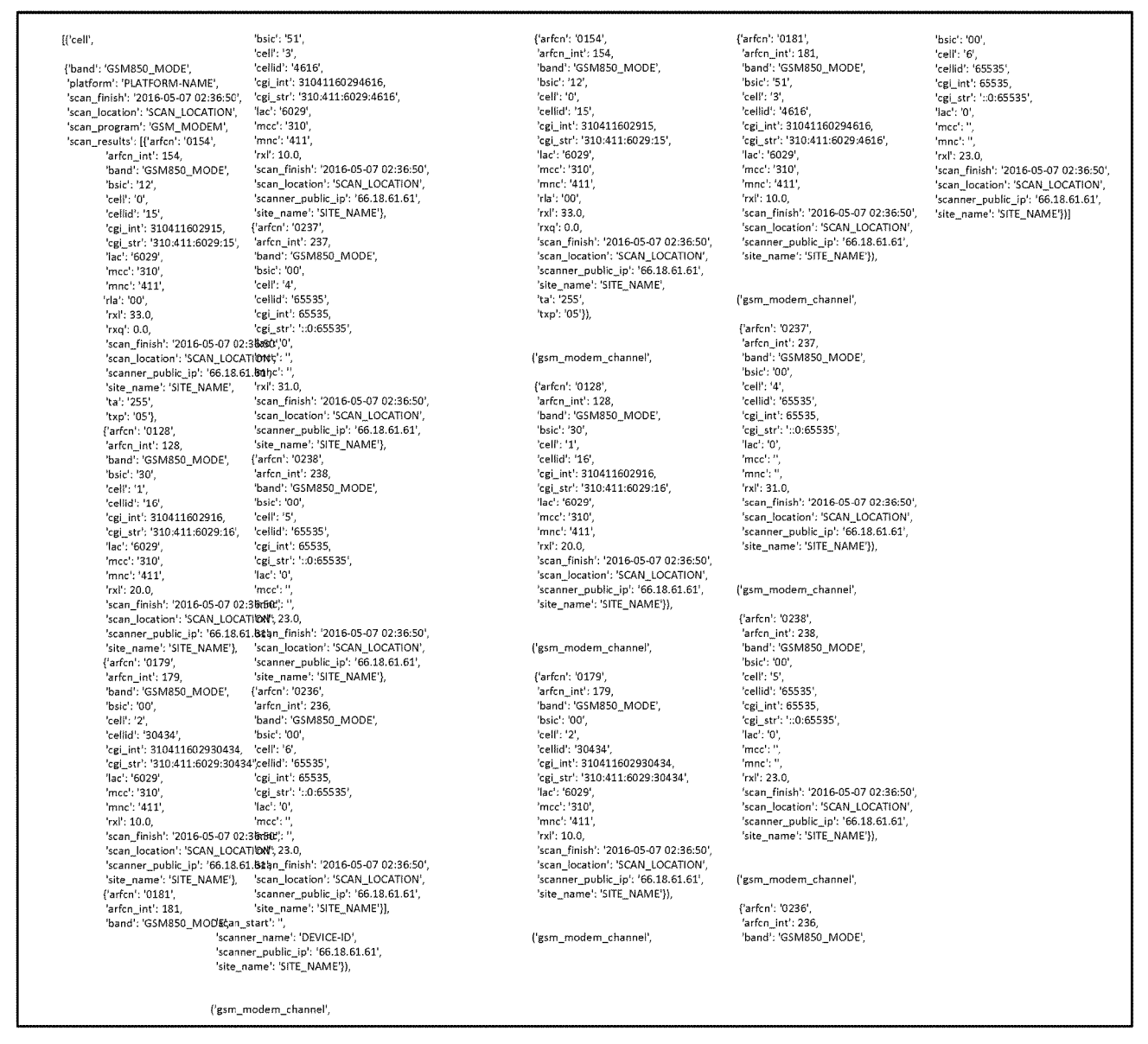

FIG. 4A is a diagrammatical illustration of the apparatus for distributed correlation of RF information 10 of FIG. 2 depicting a process when a cellular radio 26 is associated with a Base Transceiver Station (BTS) 120, in accordance with the first exemplary embodiment of the present disclosure. The apparatus 10 of FIG. 4A may include the components, structure, and functions disclosed in FIG. 2, the descriptions of which are provided relative to FIG. 2. Observations made by the cellular radio 26 may allow for the generation of a data object by the cellular collector 56. An example of the resulting data from the data object generation is depicted in FIG. 4B. This data object contains information parsed from the output of a cellular modem. This output is sent to the decomposer 62, where more specific events are generated from the initial scan document. By comparison of the events generated by the decomposer 62, as derived from the cellular collector 56, to the situation of FIG. 3A, where input from an SDR 24 is similarly parsed, logical parallels can be observed. An example of the output of the decomposer 62 of FIG. 4A when it's parsed the prior data object of FIG. 3A is depicted in FIG. 4C.

Whereas the SDR-initiated data objects of FIG. 3A were parsed into "scan" and "kal_channnel" objects, in the process of FIG. 4A, the decomposer 62 similarly produces "cell" and "gsm_modem_channel" objects. The "cell" object contains the original information produced by the GSM modem, enriched with some general scan metadata. The "gsm_modem_channel" objects contain enough information to be processed by the metadata and channel correlators 64, 48 independent of the other original "cell" data object. In this case, the channel correlator 68 may function similar the functioning of FIG. 3A, The sensor correlation data within the sensor correlation database 70 is searched to determine whether a license exists for the detected ARFCN, within range of the sensor device 40, and if not, an alert is queued for delivery to the service layer via the message transmitter 72.

The metadata correlator 64 searches the Sensor Correlation Data to determine if the Cell Global ID (CGI) has been previously observed, and if that prior observation was within feasible transmission distance of the current location of the sensor device 40. If the CGI has been previously observed at a great distance from the current location of the sensor device 40, an alert to that effect will be generated and queued for the message transmitter 72.

It is noted that while only few methods for determining the trustworthiness of a nearby BTS is disclosed herein, many detection methods may be employed in the apparatus 10 for this specific use case, including any known in the art. The decomposed data objects and any alerts generated are passed to the message transmitter 72, which in turn sends the messages to the message parsing unit 86. Any alerts received at the message parsing unit 86 may be forwarded to the user 100 via the alerting unit 88. All data objects transmitted to the service layer are stored in the original messages storage unit 92B and metrics like "rxl" (RX Level) are sent to the time-series storage unit 92A for retention. The correlation unit 96 consumes information from the time-series storage unit 92A to look for anomalies like spikes in channel RX level, and any alerts that are generated flow to the message parsing unit 86 and follow the path of user alerting through the alerting unit 88. The user 100 is able to search for all alerts generated and supporting prior scan information by querying the searching unit 98.

Figure 5:
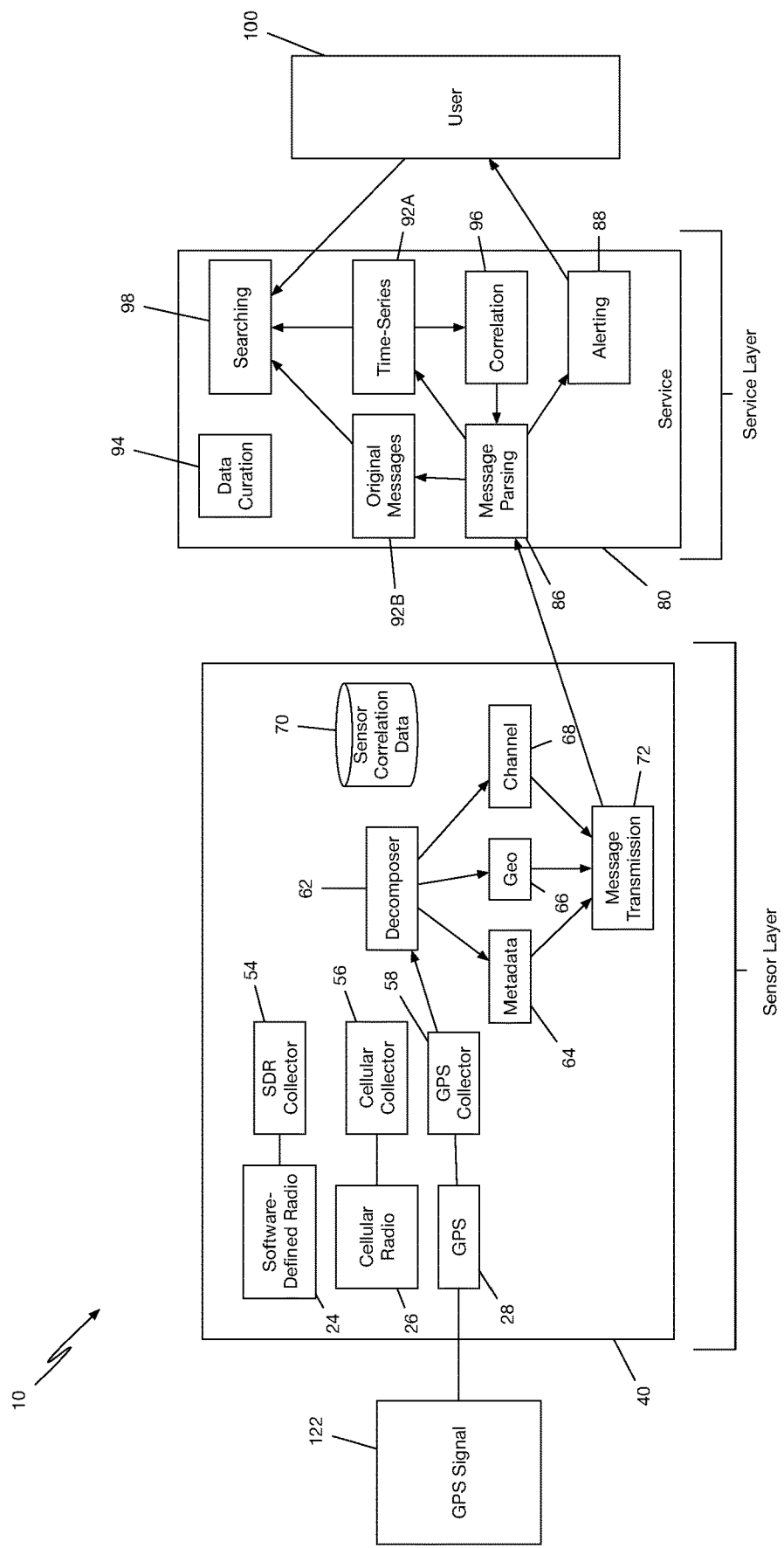
FIG. 5 is a diagrammatical illustration of the apparatus for distributed correlation of RF information of FIG. 2 depicting a process of taking GPS measurements, in accordance with the first exemplary embodiment of the present disclosure.

FIG. 5 is a diagrammatical illustration of the apparatus for distributed correlation of RF information 10 of FIG. 2 depicting a process of taking GPS measurements, in accordance with the first exemplary embodiment of the present disclosure. The apparatus 10 of FIG. 5 may include the components, structure, and functions disclosed in FIG. 2, the descriptions of which are provided relative to FIG. 2. When the GPS collector 58 is able to get a positional measurement, e.g., a GPS fix or reading using a GPS signal 122, from the GPS radio 28, the resulting data object is passed to the decomposer 62. The decomposer 62 passes copies of the resulting object to the metadata, Geo, and channel correlators 64, 66, 68.

The metadata correlator 64 and the channel correlator 68 use the GPS data object to set the geolocation of the sensor device 40 for use in feed comparisons that require geographic reference, for instance, determining if an ARFCN is licensed for use in the area or if a CGI has been observed nearby before. However, the Geo correlator 66 may handle GPS data differently. The GPS correlator 66 may use the first positional observation to set an anchor point for the sensor device 40. If, while the sensor device 40 is running, the distance between the original anchor point and subsequent GPS fixes crosses a distance threshold, an alarm indicating the presence of a GPS spoofing attack may be generated, which may follow the same flow as other alarms.

When the message parsing unit 86 receives a GPS data object, the original contents are recorded in original messages storage unit 92B, and the time and distance drift are extracted and recorded in the time-series storage unit 92A. The correlation unit 96 may apply the same algorithm, e.g., Holt-Winters, for instance, to the metrics stored in the time-series storage unit 92A, and deliver alerts to the user 100 using the path that all other alerts take, through the message parsing unit 86 and alerting unit 88. The user 100 may choose to research the information leading up to an alarm, and is free to do so using the searching unit 98.

It is noted that calculating geo distance using the Haversine formula, e.g., Cartesian vs spherical distance, the calculations of which are known in the art, is a more computationally intense and processor hungry process than calculating the distance between two points on a flat plane. Accordingly, performing this calculation on the sensor device 40 itself takes a significant processing load off of the computerized service processing device 80 in the service layer, and thus, facilitates better scaling characteristics for the service layer as compared to a computerized service processing device 80 or other service-layer device which centrally processes and correlates all telemetry from all sensor device 40. Thus, when scaled to a large market with numerous users, there are significant benefits in conducting this computationally intense processing on the sensor device 40 and not on the service layer which interfaces with numerous sensor devices.

In addition to checking for geo drift from an original anchor point, the Geo correlator 66 also checks the GPS time against the system time. GPS is oftentimes used for keeping high-precision time servers in sync, and those time servers are used to keep many data centers' clocks at exactly the same time. Causing a drift in a data center's central time server can cause big problems when sessions, such as IPSEC VPN tunnels, for instance, are prone to malfunction or failure if the time delta between the endpoints is too great. While the present disclosure is primarily described relative to detecting RF anomalies in cellular networks, the correlation of GPS information as disclosed herein can be applied to other areas of technology outside of detecting cellular network anomalies.

Figure 6:
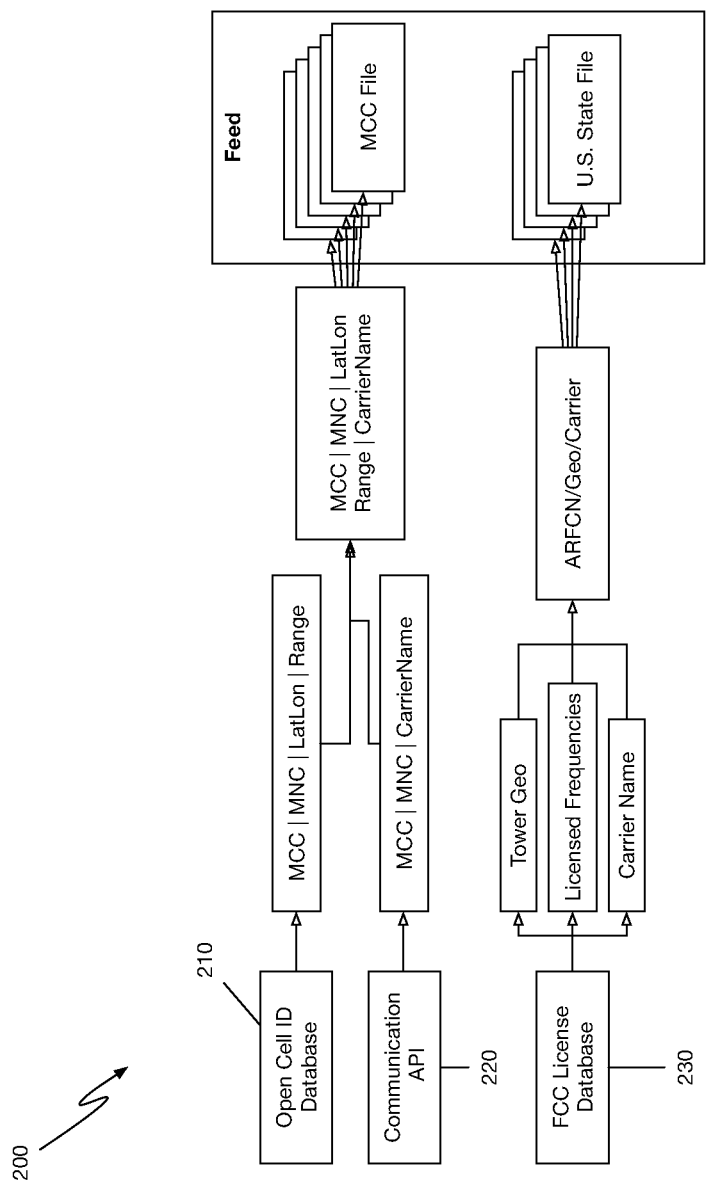
FIG. 6 is a diagrammatical illustration of a feed curation process of the apparatus for distributed correlation of RF information of FIGS. 1-5, in accordance with the first exemplary embodiment of the present disclosure.

FIG. 6 is a diagrammatical illustration of a feed curation process 200 of the apparatus for distributed correlation of RF information 10 of FIGS. 1-5, in accordance with the first exemplary embodiment of the present disclosure. More specifically, FIG. 6 is illustrative of the process by which the OSINT database (110 in FIGS. 1-2) becomes feed information consumed by the sensor devices (40 in FIGS. 1-2). The Mobile Country Code (MCC) is an identifier in the CGI that represents the country that the cellular base station is operating in. Some countries have more than one CGI. For example, in the case of the United States, the most common CGIs are 310 and 311. The OpenCellID database 210 contains metadata from cell towers observed worldwide, including the MCC for each. However, the OpenCellID database 210 does not contain the name of the provider who is operating the cell tower. To enrich the information coming from the OpenCellID database 210 with the carrier name, the MCC and MNC from the CGI can be used to correlate with the information in a known communication API 220, such as for example, the pricing API of Twilio.com. This correlation allows a feed file to be created for each MCC, which contains the carrier name for recognized CGIs. Providing the feed data based on MCC makes it possible to only load the feed information pertinent to the United States, instead of every country in the world, which makes queries on the sensor device much faster than loading feed information of all countries because the dataset is more limited.

The FCC license database 230 may be used to generate feed files based on U.S. state. The process of data curation may create a record for each ARFCN for a specific tower, and organize these records by state or by another geographic identifier. As an example, in the case of a sensor device operating in Nashville, Tenn., it would be configured to consume feed data for MCCs 310, 311, 312, 313, and 316 (all of which apply to the United States) as well as the feed information for the state of Tennessee. This keeps the data set only as big as is necessary to process what the sensor device might see. While comparing all observations against a feed database comprised of all cell towers worldwide is computationally expensive and processor hungry, in the apparatus 10, this processing can be handled by each sensor device itself and not on a service level, which allows the apparatus 10 to utilize processor computing power in devices, e.g., cellular phones and other mobile communication devices, that would be otherwise underutilized.

Figure 7:
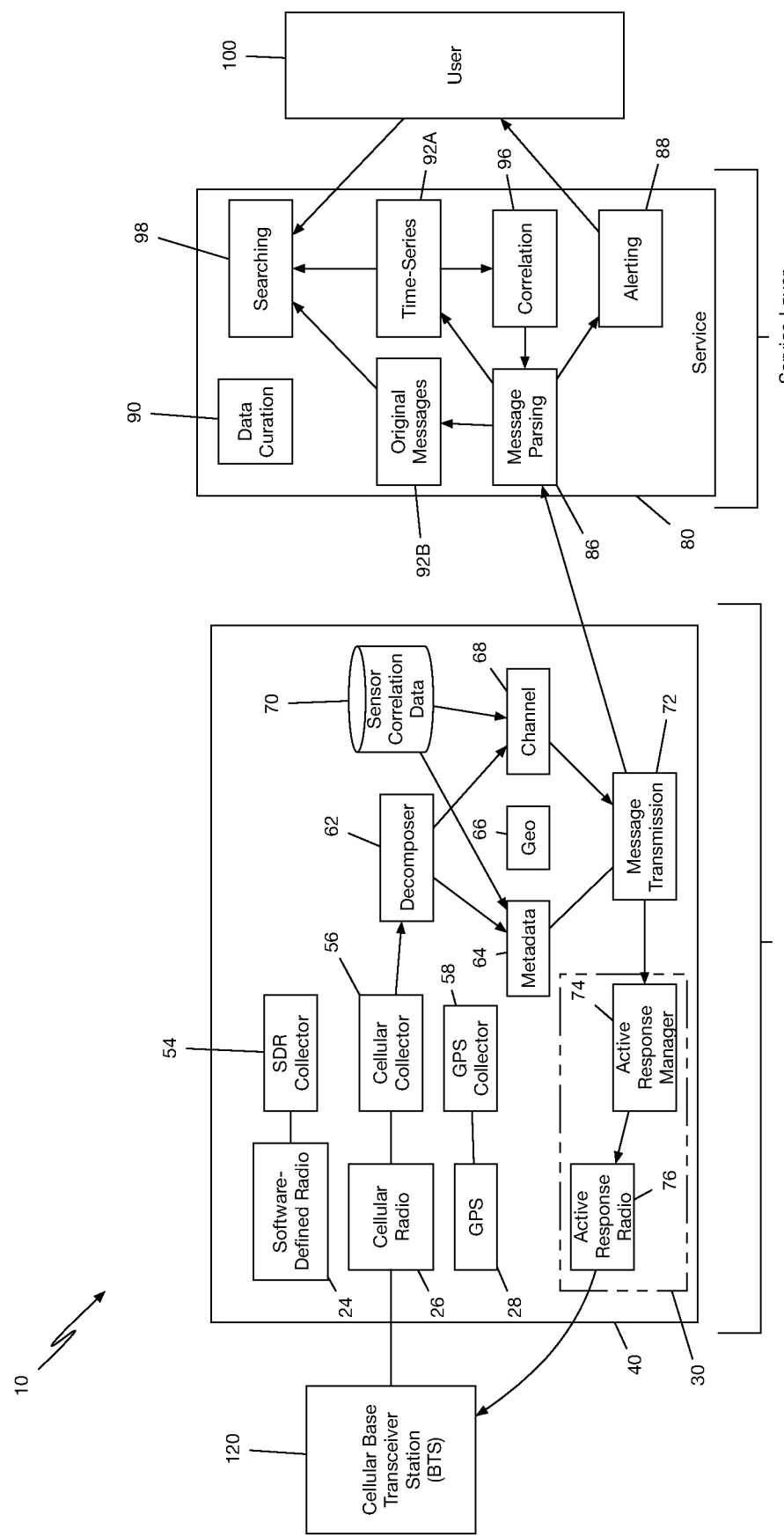
FIG. 7 is a diagrammatical illustration of the apparatus for distributed correlation of RF information of FIG. 4A further illustrating an active response subprocess, in accordance with the first exemplary embodiment of the present disclosure.

FIG. 7 is a diagrammatical illustration of the apparatus for distributed correlation of RF information 10 of FIG. 4A further illustrating an active response subprocess 30, in accordance with the first exemplary embodiment of the present disclosure. The apparatus 10 of FIG. 7 may include the components, structure, and functions disclosed in FIG. 4A, the descriptions of which are provided relative to FIG. 2. In particular, FIG. 7 illustrates the active response subprocess 30 which may allow the sensor device 40 to take steps to neutralize the effects of a malicious device. Through the process of reception using the cellular radio 26, the cellular collector 56, the decomposer 62, and correlators 64, 68, as described relative to FIG. 4A, the sensor device 40 can determine that the Cellular BTS 120 is malicious. Scan documents and alerts pass through the message transmitter 72 to the service layer, as described in FIG. 4A. Additionally, when an active response is underway, the information transmitted to the service layer may also include additional alert message(s) notifying the user 100 that an active response to a threat is underway.

The active response subsystem 30 may include the message transmitter 72 notifying the active response subsystem 30 via an active response manager 74 that a malicious BTS has been observed broadcasting on a specific ARFCN. The active response manager 74 causes one or more active response radios 76 to broadcast radio noise at the malicious BTS's 120 observed broadcast frequency, and/or the receive frequency associated with the ARFCN, which would render the BTS unable to effectively communicate with cellular devices in the protected area. The active response action may terminate after a pre-configured amount of time, or the active response may continue until, through the process of correlation, the threat has been determined to be no longer present. As shown in FIG. 7, the feedback loop used for triggering and carrying out the active response may be enclosed entirely within the sensor device 40 itself, which allows the sensor device to still perform an active response even if it has been disconnected from the service layer, which is likely during the duration of an attack if the transport between the sensor device 40 and the service layer are cellular networks.

It should be noted that certain process descriptions or blocks in flow charts may be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. An apparatus for distributed correlation of radio frequency (RF) information comprising:
at least one radio device having an RF transceiver;
at least one sensor device in communication with the at least one radio device, wherein the at least one sensor device has:
a collector, extracting signal data from the at least one radio device, wherein the signal data is identifying data of a cellular base station and location data of that cellular base station; and
a correlator, correlating the extracted signal data with sensor correlation data stored within at least one database of the at least one sensor device to detect at least one anomaly in the extracted signal data, wherein the at least one database includes data received from a governmental license database providing licensed frequency range data and data received from at least one open source intelligence database (OSINT), wherein the location data of the cellular base station and an absolute radio frequency channel number (ARFCN) data reported in the extracted signal data are compared against the licensed frequency range data received from the governmental license database to determine a licensed status of the cellular base station, whereby the at least one anomaly is determined based on a deviation between the location of the cellular base station and the ARFCN data reported in the extracted signal data, and the licensed frequency range data received from the governmental license database; and a computerized service processing device having at least one processor and a non-transitory memory, wherein, when the at least one anomaly is detected in the extracted signal data, the computerized service processing device receives the correlated extracted signal data from the at least one sensor device and executes at least one of:
- an alert process to alert a user of the detected anomalies; and
- an updating process to a correlation sub-system within the computerized service processing device;

wherein the at least one detected anomaly is curated by the computerized service processing device by receiving data about known RF anomalies from the at least one OSINT that feeds into the correlation sub-system in the computerized service processing device, and wherein the at least one curated detected anomaly is transmitted, from the computerized service processing device, to the at least one database of the at least one sensor device to update the sensor correlation data stored therein.

2. The apparatus of claim 1, wherein the updating process to the correlation sub-system further comprises detection of the at least one anomaly within the correlated extracted signal data by analyzing time-series data of the correlated extracted signal data.

3. The apparatus of claim 2, wherein analyzing time-series data of the correlated extracted signal data further comprises extracting and recording measurements from the received correlated extracted signal data into a time-series database.

4. The apparatus of claim 1, wherein the computerized service processing device records the correlated extracted signal data in its entirety when it is received.

5. The apparatus of claim 1, wherein the at least one sensor device further comprises at least two sensor devices, wherein telemetry data of the correlated extracted signal data produced by the at least two sensor device is aggregated to produce time-series data.

6. The apparatus of claim 1, wherein the signal data further comprises at least one of: RF signal data and wireless network metadata.

7. The apparatus of claim 1, wherein the sensor correlation data stored within the at least one database within the at least one sensor device further comprises at least one of: known locations of the transceiver and expected channel metadata observations.

8. The apparatus of claim 1, wherein the computerized service processing device receives an original message from which the correlated extracted signal data was derived.

9. The apparatus of claim 1, wherein the correlator correlates the extracted signal data with measurement data of the at least one sensor device derived by the at least one sensor device within a current run-cycle.

10. The apparatus of claim 1, wherein the at least one radio device has at least one of: a software-defined radio (SDR), a cellular radio, and a global positioning system (GPS) chip.

11. The apparatus of claim 10, wherein the collector of at least one sensor device further comprises at least one of: a SDR collector, a cellular collector, and a GPS collector configured to extract signal data from the SDR, the cellular radio, and the GPS chip, respectively.

12. The apparatus of claim 1, wherein the at least one sensor device communicates with the computerized service processing device over a wired connection only.

13. An apparatus for anomaly detection in a radio frequency (RF) signal, the apparatus comprising:
- a radio device having an RF transceiver;
- a sensor device physically connected to, and in electronic communication with, the radio device, the sensor device having:
  - a collector, extracting signal data from the radio device, wherein the signal data is identifying data of a cellular base station and location data of that cellular base station;
  - a sensor correlation database accessible by the sensor device, wherein at least a portion of the sensor correlation database includes data received from a governmental license database providing licensed frequency range data;
  - a correlator, correlating the extracted signal data to detect at least one anomaly in the extracted signal data, wherein the extracted signal data is correlated with:
    - sensor correlation data stored within the sensor correlation database; and
    - geolocation data of the sensor device, wherein a location of the cellular base station and an absolute radio frequency channel number (ARFCN) data reported in the extracted signal data are compared against the licensed frequency range data received from the governmental license database to determine a licensed status of the cellular base station whereby the at least one anomaly is determined based on a deviation between the location of the cellular base station and the ARFCN data reported in the extracted signal data, and the licensed frequency range data received from the governmental license database; and
- a computerized service processing device having at least one processor and a non-transitory memory, wherein, when the at least one anomaly is detected in the extracted signal data, the computerized service processing device receives the correlated extracted signal data from the at least one sensor device and executes an updating process to a correlation sub-system within the computerized service processing device, wherein the at least one detected anomaly is curated by the computerized service processing device by receiving data about known RF anomalies from at least one open source intelligence database (OSINT) that feeds into the correlation sub-system in the computerized service processing device, and wherein the at least one curated detected anomaly is transmitted, from the computerized service processing device, to the sensor correlation database to update the sensor correlation data stored therein.

14. A method for distributed correlation of radio frequency (RF) information comprising:
- providing at least one sensor device in communication with at least one radio device having an RF transceiver;
- extracting signal data from the at least one radio device with a collector of the at least one sensor device, wherein the signal data is identifying data of a cellular base station and location data of that cellular base station;
- correlating, by the sensor device, the extracted signal data with sensor correlation data stored within at least one database of the at least one sensor device to detect at least one anomaly in the extracted signal data, wherein the at least one database includes data received from a governmental license database providing licensed frequency range data and data received from at least one open source intelligence database (OSINT), wherein a location of the cellular base station and an absolute radio frequency channel number (ARFCN) data reported in the extracted signal data are compared against the licensed frequency range data received from the governmental license database to determine a licensed status of the cellular base station, whereby the at least one anomaly is determined based on a deviation between the location of the cellular base station and the ARFCN data reported in the extracted signal data, and the licensed frequency range data received from the governmental license database; and transmitting, by the sensor device, the correlated extracted signal data to a computerized service processing device when at least one anomaly is detected, wherein the computerized service processing device has at least one processor and a non-transitory memory, and wherein, after receiving the correlated extracted signal data from the at least one sensor device, the computerized service processing device executes at least one of:

an alert process to alert a user of the detected anomalies; and an updating process to a correlation sub-system within the computerized service processing device;

wherein the at least one detected anomaly is curated by the computerized service processing device by receiving data about known RF anomalies from the at least one OSINT that feeds into the correlation sub-system in the computerized service processing device, and wherein the at least one curated detected anomaly is transmitted, from the computerized service processing device, to the at least one database of the at least one sensor device to update the sensor correlation data stored therein.

15. The method of claim 14, wherein the updating process to the correlation sub-system further comprises detecting the at least one anomaly within the correlated extracted signal data by analyzing time-series data of the correlated extracted signal data.

16. The method of claim 15, wherein analyzing time-series data of the correlated extracted signal data further comprises extracting and recording measurements from the received correlated extracted signal data into a time-series database.

17. The method of claim 14, wherein the signal data further comprises at least one of: RF signal data and wireless network metadata, and the sensor correlation data stored within the at least one database within the at least one sensor device further comprises at least one of: known locations of the transceiver and expected channel metadata observations.

18. The method of claim 14, further comprising correlating the extracted signal data with measurement data of the at least one sensor device derived by the at least one sensor device within a current run-cycle.

19. The method of claim 14, wherein extracting signal data from the at least one radio device with the collector further comprises at least one of:

extracting software-defined radio (SDR) information from a SDR of the at least one radio device with a SDR collector in the at least one sensor device;

extracting cellular radio information from a cellular radio of the at least one radio device with a cellular collector of the at least one sensor device; and extracting global positioning system (GPS) information from a GPS chip of the at least one radio device with a GPS collector in the at least one sensor device.

\* \* \* \* \*